United States Patent [15] 3,685,046
Howlett [45] Aug. 15, 1972

[54] SEISMIC PLAYBACK/MONITOR SYSTEM

[72] Inventor: Donald L. Howlett, Houston, Tex.
[73] Assignee: Texaco, Inc., New York, N.Y.

[22] Filed: June 2, 1970
[21] Appl. No.: 42,653

Related U.S. Application Data

[63] Continuation-in-part of Ser. No. 832,904, June 13, 1969, abandoned.

[52] U.S. Cl. ........................340/347 DA, 235/150.53
[51] Int. Cl. ............................................H03k 13/04
[58] Field of Search .........235/150.5, 150.51, 150.52, 235/150.53, 154, 194, 197, 198, ; 340/347, 324, 324 A; 328/142, 143, 145; 340/15.5

[56] References Cited

UNITED STATES PATENTS

| | | | |
|---|---|---|---|
| 3,376,557 | 4/1968 | Godinez | 340/15.5 X |
| 3,458,859 | 7/1969 | Godfrey, Jr. et al. | 340/15.5 |
| 3,555,540 | 1/1971 | Hartke | 340/347 DA |
| 3,325,802 | 6/1907 | Bacon | 340/324 |

*Primary Examiner*—Maynard R. Wilbur
*Assistant Examiner*—Charles D. Miller
*Attorney*—Thomas H. Whaley and Carl G. Reis

[57] ABSTRACT

Having digitized a wide dynamic amplitude range analog signal $V_{in}$ and recorded it in digital word from comprising a binary coded mantissa A and a binary coded exponent E, where A and E are related to a constant radix or base (e.g., the decimal number 8) the present invention provides methodology and apparatus for converting A and E to an analog signal $V_o$ of compressed dynamic amplitude range for the purpose of making playbacks in the form of oscillograms therefrom. As initially recorded in digital form the digital word is, mathematically, $V_{in}=\pm A8^{-E}$ equation 1. According to one illustrative embodiment of the invention, in reconverting the digitally recorded A and E data to obtain the desired analog signal $V_o$, digital signals representing A are converted to an analog signal $V_{(D-A)} = AV_{ref}$ equation 5 where $V_{ref}$ is a periodic function of time t. Digital signals representing the E data are processed to provide a signal representative of a new exponent (K–E) where K is changed by a predetermined magnitude each time $V_{ref}$ attains a predetermined magnitude. Analog signal $V_{(D-A)}$is delivered to an arrangement of cascaded amplifier stages, each of which has a gain of 8. The signal (K–E) gates the amplified $V_{(D-A)}$ signal through a particular stage of said amplifier arrangement to yield the analog signal $V_o = V_{(D-A)}8^{(K-E)}$equation 6 which can also be stated as $V_o = V_{in}\ V_{ref}8^K$ equation 7. Also, in accordance with the invention various forms of programmed gain control may be introduced in that a time varying gain function G(t) is applied to $V_{ref}$. Moreover, in accordance with another aspect of the invention a form of automatic gain control is introduced by enabling signal $V_o$ to control the rate of gain expansion.

11 Claims, 4 Drawing Figures

SEISMIC PLAYBACK/MONITOR SYSTEM

CROSS-REFERENCE

This is a continuation-in-part of U.S. Pat. application Ser. No. 832-904, now abandoned filed 13 June 1969 in behalf of Donald L. Howlett and entitled "Seismic Playback System."

BACKGROUND OF THE INVENTION

This invention pertains, in general, to making analog form playbacks from digitally recorded data (e.g., seismic data) which has been digitized from wide dynamic amplitude range analog form data signals initially generated by transducers, such as geophones in response to acoustically induced seismic disturbances; and, in particular, to the making of analog form playbacks such as oscillograms (or wiggle traces as they are often called by those engaged in seismic work) which are approximate, but very useful, reproductions in compressed range of the wide dynamic range amplitude-versus-time characteristic curves of the analog signals initially generated by the aforementioned transducers, or geophones.

The aforementioned oscillograms may be made substantially simultaneously with the acquisition of the signals generated by the geophones; i.e., the system functions as a monitoring system. Alternatively, the oscillograms may be made at any time after the acquisition of the signals generated by the geophones, i.e., the system functions as a playback system.

Although the invention is hereinafter described as being employed in conjunction with digital seismic recording systems such as those disclosed in the patents and patent application hereinafter identified it is, nevertheless, to be understood that the invention's field of use is not limited to seismic data processing.

In, for example, seismic exploration work each acoustically driven geophone generates wide dynamic amplitude range signals in analog form. When such signals are processed through a digital seismic recording system of the type disclosed in the patents and patent application hereinafter identified there is produced a high fidelity record in digital form covering the wide dynamic range of amplitudes of the seismic signals. The reason that the digital form record is referred to herein as a high fidelity record is because the signal amplitudes are recorded accurately throughout their wide dynamic range; e.g., many binary bit positions are employed to accurately record the highest signal amplitudes as well as the lowest where the range (i.e., the ratio of the highest amplitudes to the lowest amplitudes) may be of the order of $10^6$. The invention, hereinafter disclosed and illustrated in the accompanying drawings, provides methodology and apparatus for making analog form oscillograms, or wiggle traces, from the recorded digital data. The oscillograms, or wiggle traces, are of relatively lower fidelity than the aforementioned digitally recorded data. Although these oscillograms are of relatively lower fidelity serious distortions are, nevertheless, not introduced in reconverting the digital data to analog form data for the purpose of making compressed range oscillograms.

The recordation in digital form of wide dynamic amplitude range analog signals initially generated by geophones is disclosed in, among others, the following:

U.S. Pat. No. 3,241,100 granted Mar. 15, 1966 in behalf of R.J. Loofbourrow and entitled "Digital Seismic Recording System"; U.S. Pat. No. 3,264,574 granted Aug. 2, 1966 in behalf of R.J. Loofbourrow and entitled "Amplifier System"; and U.S. Pat. No. 3,603,972, which issued Sept. 7, 1971, on application Ser. No. 786,706 filed Dec. 24, 1968 in behalf of James R. Vanderford and entitled "Amplifier System."

As is disclosed in the patents and patent application hereinbefore identified the problem solved is the problem of accurately recording seismic data which in analog form has a dynamic range of amplitudes which is extremely wide. For example, a typical analog signal level for a reflection seismic record runs from several volts of amplitude at its maximum, at the early shock portion of the record, to less than a single microvolt at the end of the seismic record when very low amplitude seismic disturbances are detected. To put it very generally, the aforementioned patents and patent application solve the problem by converting the wide dynamic amplitude range analog signals to digital form. When converted to digital form occupying a relatively large number of binary bit positions the full dynamic amplitude range of the analog signal initially generated by a geophone is preserved in recorded form on magnetic tape. Advantageously, the magnetically recorded digital data may subsequently be delivered to a computer for further processing. Some ways and some purposes for which such digital data is subsequently processed in a computer are disclosed in an article "-Tools For Tomorrow's Geophysics" by Milton B. Dobrin and Stanley H. Ward, published in the journal "Geophysical Prospecting," Vol. X, pages 433–452 (1962).

In the patent application of Vanderford, hereinbefore identified, there is disclosed a system wherein portions of an analog signal are converted to digital words where each digital word occupies a number of binary bit positions. Moreover, each such digital word is recorded in floating point form, or notation. Advantageously, the floating point form allows greater flexibility of operation and easier handling of numbers differing greatly from each other in magnitude. See, for example, the textbook "Digital Computer Primer" by E. M. McCormick, 1959, published by McGraw-Hill Book Co., Inc., beginning at page 152. In the system disclosed in the Vanderford patent application a floating point digital number, or word, in the form of a mantissa and an exponent is recorded on magnetic tape. The floating point digital number, or word, represents the instantaneous absolute seismic voltage amplitude as it enters the floating point amplifier system disclosed by Vanderford, said voltage amplitude being the voltage amplitude delivered by a geophone to the amplifier system of Vanderford. The dynamic range of the floating point digital number, or word, may be in excess of 200 db, if necessary, to cover the dynamic amplitude range of input signals (equivalent to a 36 binary bit digital number, or word).

A specific example of the aforementioned floating point digital word as set forth in conventional algebraic form is as follows:

$$V_{in} = \pm A 8^{-E} \qquad \text{equation 1.}$$

where $V_{in}$ represents the instantaneous absolute seismic voltage amplitude generated by the geophone, which voltage enters the floating point amplifier system of Vanderford; A represents the mantissa, or argument, portion of the digital word; 8 represents the radix, or base of the number system used (and is also the gain of each amplifier stage of the arrangement of amplifiers disclosed by Vanderford); and, $E$ represents the exponent (and also represents the number of amplifier stages of gain of 8 through which the input signal $V_{in}$ has passed in the amplifier system disclosed by Vanderford).

In order to record the floating point digital word of equation 1 in a binary register or on magnetic tape with, for example, 144 db of dynamic range and 14 bit accuracy 18 bit positions would be required where the mantissa $A$ is represented in binary form and where the exponent $E$ is also represented in binary form. Of the 18 bits required: one bit represents the sign (±) allowing for bipolar input-output capabilities; 14 bits represent the mantissa $A$; and, three bits represent the exponent $E$.

Although there are many advantages, some of which are set forth in the aforementioned published article of Dobrin and Ward, to recording seismic signals in digital form, there still remains the need to make available to a seismic prospector, among others, a visible record of the seismic data, or portions of it. Conventionally, the visible record is an oscillogram, or wiggle trace as it is often called by seismic prospectors. Often, it is desirable for a seismic prospector in a seismic field crew in a location remote from a main data processing center to take a quick look at a portion of the seismic data from time to time, i.e., look at wiggle traces. For example, a seismic prospector may wish to make some interpretations with respect to the wiggle trace data after coordinating such data with geological data.

The invention hereinafter disclosed and illustrated in the accompanying drawing FIGURES is particularly concerned with converting the recorded digital data to the familiar wiggle trace form on recording paper. Alternatively, the analog form wiggle traces may be displayed on the face of a cathode ray oscilloscope. The recording paper, for example, allows about 40 db dynamic amplitude range while the digitally recorded floating point word may have a dynamic range of 156 db or more. Thus, in converting from digital form to a practical analog form selective compression of the various amplitudes must occur. In such a conversion distortion is necessarily introduced. However, the methodology of the present invention minimizes such distortions and, as a result, there is provided analog form data in the form of oscillograms, or wiggle traces, which provide useful information to seismic prospectors, among others.

SUMMARY OF THE INVENTION

One object of the present invention is to convert data from a digital form to an analog form.

Another object of the present invention is to provide new and useful methodology for converting data from digital form to analog form.

Another object of the present invention is to provide new and useful apparatus for converting data from digital form to analog form.

Another object of the present invention is to convert wide dynamic amplitude range digital data (e.g., seismic data) to analog form oscillograms, or wiggle traces.

Another object of the present invention is to convert wide dynamic amplitude range digital data to analog form data such as oscillograms, which oscillograms are selectively compressed reproductions of the wide dynamic amplitude range signals which existed prior to their conversion to said digital state.

Another object of the present invention is to convert wide dynamic amplitude range digital form data to analog form data having selectively compressed amplitudes without introducing serious distortion.

Briefly, in accordance with one illustrative embodiment of the invention digitally recorded signals representative of a mantissa $A$ and an exponent $E$ are processed for the purpose of obtaining a desired analog signal $V_0$. In order to achieve the desired result digital signals representing $A$ are converted to an analog signal $V_{(D-A)} = AV_{ref}$ equation 5 where $V_{ref}$ is a function of time $t$. Also, digital signals representing the $E$ data are processed to provide a signal representative of a new exponent $(K-E)$ where $K$ is changed by a predetermined magnitude each time $V_{ref}$ reaches a predetermined magnitude. The analog signal $V_{(D-A)}$ is delivered to an arrangement of amplifier stages, each of which has a gain of 8. The signal (K−E) gates the amplified $V_{(D-A)}$ signal through a particular stage of said amplifier arrangement to yield the analog signal $V_o = V_{(D-A)}\, 8^{(K-E)}$ equation 6 which can also be stated as $V_o = V_{in}\, V_{ref}\, 8^K$ equation 7.

In accordance with another embodiment of the invention various forms of programmed gain control may be introduced in that a time varying gain function $G(t)$ is applied to $V_{ref}$.

Moreover, in accordance with another embodiment of the invention a form of automatic gain control is introduced by enabling the signal $V_o$ to control the rate of gain expansion.

Other objects as well as the various features and advantages of the invention will become apparent from the following detailed description as considered in conjunction with the accompanying drawing figures which form a part of this specification.

DESCRIPTION OF THE PREFERRED EMBODIMENTS

Figure 1:
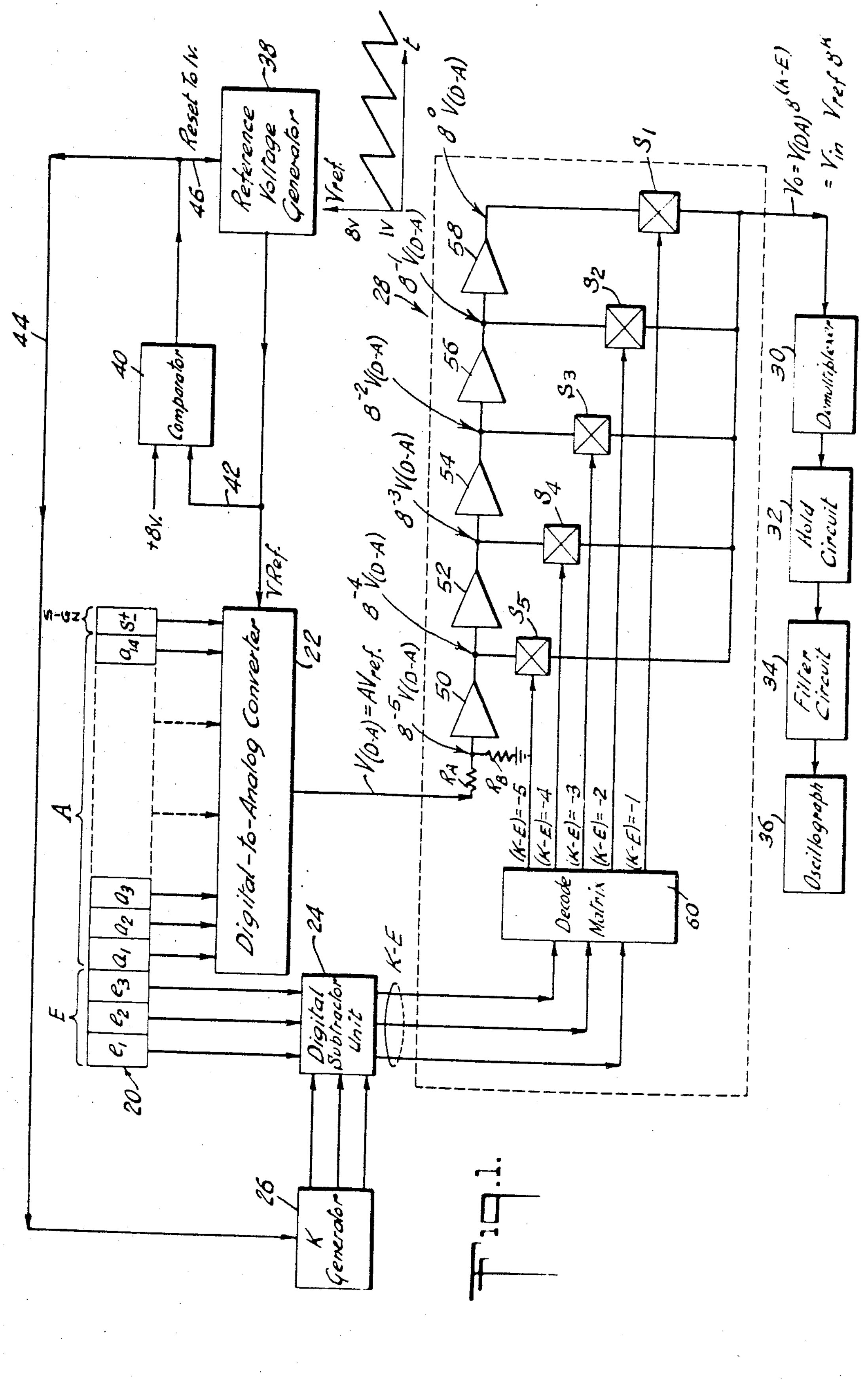
FIG. 1 is a block diagram of a generalized form of the invention illustrating apparatus for converting wide dynamic amplitude range digital $A$ and $E$ data to a compressed amplitude range analog signal form $V_o$ for making oscillograms or wiggle traces.

As shown in FIG. 1, there is provided a register 20 which stores 18 binary digits, or bits, which represent in digital form the amplitude of a seismic signal generated by a geophone. Of these eighteen bits three bits, identified at bit locations $e_1$, $e_2$, and $e_3$, in the register 20, as shown, represent the exponent E of a floating point digital word. In register 20 the fourteen bits identified at bit locations $a_1$ through $a_{14}$ represent the mantissa $A$ and one bit identified at bit location S± represents the sign, or polarity, of the seismic signal.

The above-mentioned eighteen bits may be assumed to have been initially recorded in a suitable storage means in the amplifier system disclosed in the U.S. patent application of James R. Vanderford, Ser. No. 786,706, filed Dec. 24, 1968 and subsequently transferred to the register 20. Register 20 may be included in the amplifier system of Vanderford or for present playback purposes may be considered to be an auxiliary register. Also, as indicated hereinbefore, since each amplifier stage in Vanderford's amplifier system has a constaint gain of eight (8) then only the bits representing the exponent $E$ and the mantissa A need to be recorded and ultimately delivered to the register 20.

The one bit representing the sign and the 14 bits representing the mantissa are subsequently transferred to a digital-to-analog (D—A) converter 22 as shown in FIG. 1. Another input to the D—A converter 22 is a variable reference voltage identified as $V_{ref}$. The source and character of $V_{ref}$ is discussed hereinafter in more detail, including pertinent mathematical relationships.

As shown the three bits representative of the exponent $E$ are transferred from register 20 to a digital subtractor unit 24. Also, three additional bits representing an integer $K$ are delivered to the digital subtractor unit 24 by a $K$ generator, or counter, 26. In the specific embodiment shown in FIG. 1, let it be assumed that exponent $E$ may be any one of the decimal values 1, 2, 3, 4 or 5, and, hence, in binary form the bits $e_1$, $e_2$, $e3$ would range from 001 to 101. $K$, which is also represented by three bits, is also an integer. Details respecting the $K$ generator, or counter, 26 are discussed in more detail hereinafter. $K$ may have any one of the decimal values 0, 1, 2, 3, or 4 (binary digits, or bits, ranging from 000 to 100).

As is indicated in FIG. 1, the subtractor unit 24 delivers an output consisting of digital signals representative of three bits which, in turn, represent the integer $(K-E)$. These binary digits or bits representing $(K-E)$ are subsequently delivered to an amplifier unit designated generally by the reference number 28 contained within the dotted line box in FIG. 1. Amplifier unit 28 has a gain $G=8^{(K-E)}$.

The amplifier unit 28 includes an attenuator comprising the resistors $R_A$ and $R_B$ as shown in FIG. 1. This attenuator feeds into a first stage amplifier 50. Arranged in cascade relationship with amplifier 50 are four additional stages of amplifiers designated by the reference numbers 52, 54, 56, and 58. Each of these amplifiers has a gain $G=8$. As shown in FIG. 1 there is connected at the output of each of the amplifier stages the switch units designated as $S_1$, $S_2$, $S_3$, $S_4$ and $S_5$.

Also shown in FIG. 1 is a decode matrix 60. As is indicated digital form signals representing $(K-E)$ are fed into the decode matrix 60. These digital signals representative of the integer $(K-E)$ are received by the decode matrix 60 from the digital subtractor unit 24. As is indicated there are five outputs delivered from decode matrix 60. As is indicated in FIG. 1 each of the five outputs from decode matrix 60 is designated with reference to the output integer $(K-E)$ ranging from the decimal number-1 through-5. Signal $(K-E)=-1$ drives the switch unit $S_1$. Signal $(K-E)=-2$ $S_2$. Signal $(K-E)=-3$ drives switch unit $S_3$. Signal $(K-E)=-4$ drives switch unit $S_4$. Signal $(K-E)=-5$ drives switch unit $S_5$. The combination of the cascaded amplifiers 50 through 58 and the switches $S_1$ through $S_5$ constitute in effect the floating point amplifier system disclosed in the Vanderford patent application hereinbefore identified.

Thus, as suggested at FIG. 1 and as hereinbefore explained when signal $(K-E)=-1$ gates, or opens, the switch $S_1$ then the ampiifier 58 delivers an output voltage $V_o = V_{(D-A)}\, 8^{-1}$. Similarly, amplifier 56, in response to actuation of $S_2$, would deliver an output $V_o = V_{(D-A)}\, 8^{-2}$; and so forth.

As indicated in FIG. 1 an analog form output signal voltage identified as $V_{(D-A)}$ is delivered from the (D—A) converter 22 to amplifier unit 28. As indicated, this signal voltage $V_{(D-A)}$ enters the amplifier unit 28 via the attenuator network comprising resistors $R_A$ and $R_B$. Amplifier unit 28, in turn, delivers an analog form output voltage signal identified as $V_o$ to a demultiplexer 30. From demultiplexer 30 the signal is delivered to a hold circuit 32 and then to a filter circuit 34 from whence said signal may be delivered to a galvanometer-type oscillograph 36 which makes visible oscillograms, or wiggle traces, of compressed dynamic amplitude.

In practice, many geophones are used in the recording process. Therefore multi-channel playbacks are needed. To increase the number of playback channels, it is necessary to repeat only blocks 32, 34, 36 in FIG. 1. The remainder of FIG. 1 is common to all channels.

In order to provide the variable reference voltage $V_{ref}$ and also to change the value of $K$ delivered at the output of the $K$ generator 26 there is included in the system of FIG. 1 a reference voltage generator 38 and a comparator 40. As indicated a positive source of +8 volts is included for the purpose of providing a reference voltage for comparator 40. In addition, the other reference voltage $V_{ref}$ is fed as another input to comparator 40 via the path 42. The output signal from comparator 40 is fed via path 44 to the $K$ generator 26 in order to change the value of $K$ delivered to subtractor unit 24 by the $K$ generator 26.

The output signal from comparator 40 is also delivered via path 46 to a reference voltage generator 38. This signal via path 46 to generator 38 serves the purpose of resetting the $V_{ref}$ output voltage to a lower value (+1 volt). The resetting of $V_{ref}$ in this respect will be discussed in more detail hereinafter.

In order to fully understand the functioning and operational philosophy of the system of FIG. 1 the following mathematical analysis will prove helpful:

In recording the wide dynamic range signal in digital word form in the floating point amplifier disclosed in Vanderford's patent application, hereinbefore identified, the relationship between the mantissa $A$ and exponent $E$ is:

$$A = V_{in}8^E \quad \text{equation 1A}$$

wherein $A$ represents the mantissa; $E$ represents the exponent, decimal number *8* is the gain of each amplifier stage in Vanderford's system and is also the radix of the number system used; and $V_{in}$ represents the amplitude of the input voltage signal delivered by a geophone to Vanderford's system.

The D—A converter 22 converts the bits $a_1 \ldots a_{14}$ representing the mantissa $A$ to an analog signal voltage $V_{(D-A)}$. However, this signal voltage is meaningless unless it is "defloated"; i.e., multiplied by the appropriate power of 8. Therefore, one method according to the invention disclosed herein is to deliver the analog voltage signal $V_{(D-A)}$ to the amplifier unit 28 having a gain $G = 8^{(K-E)}$. Amplifier unit 28 produces output voltage $V_o$, defined as follows:

$$V_o = V_{in}V_{ref}8^E8^{(K-E)} \quad \text{equation 2}$$

Since from equation 1$A$, $A$ is defined as $A = V_{in}8^E$, then by substitution $$V_o = V_{in}V_{ref}8^E8^{(K-E)} \quad \text{equation 3}$$

Equation 3 is reducible to the following:

$$V_o = V_{in}V_{ref}8^K \quad \text{equation 4}$$

Therefore, $V_o$ is the original geophone input signal multiplied by $V_{ref}$ and also by an amplification factor $8^K$.

Furthermore, D–A converter 22 delivers an output analog voltage $V_{(D-A)}$ which is proportional to both mantissa $A$ and $V_{ref}$ where ($0 \leq A \leq 1$). Mathematically, $$V_{(D-A)} = AV_{ref} \quad \text{equation 5}$$

Since the gain of amplifier 28 is $8^{(K-E)}$ then $$V_o = V_{(D-A)}8^{(K-E)} \quad \text{equation 6}$$

and by substitution in equation 6 of equations 1 and 5 the result is $$V_o = V_{in}V_{ref}8^K \quad \text{equation 7}$$

Thus according to equation 7 the output voltage $V_o$ will be a reproduction of the general form or shape of the original input voltage $V_{in}$.

Equation 7 is a general statement, in mathematical form, of the philosophy of operation of the system shown in FIG. 1 and FIG. 1 illustrates a generalized embodiment of the invention. Stated briefly, in the system of FIG. 1 both $V_{ref}$ and $K$ are changed to yield an output signal $V_o$ which, with respect to $V_{in}$, has a dynamic amplitude range which is compressed. The operation of the system illustrated in FIG. 1 is as follows:

Signals representing the exponent ($e$) bits are delivered to digital subtractor unit 24 from register 20. Also, signals representing mantissa $A$ and signal S± bits are fed to D—A converter 22 from register 20. The reference voltage generator 38 delivers signal $V_{ref}$ to D—A converter 22. In accordance with one specific illustrative, but not limiting, embodiment of the invention $V_{ref}$ is varying with respect to time between +1 volt and +8 volts and, also, $V_{ref}$ is a periodic function. (See the sawtooth waveform in FIG. 1 adjacent the generator 38).

The comparator 40 via path 42 senses the level of $V_{ref}$ and compares it with its +8 volts reference input. Each time $V_{ref}$ reaches +8 volts comparator 40 delivers an output pulse which does two things: resets $V_{ref}$ to +1 volt (via path 46 to generator 38) and causes the $K$-generator 26, or counter, to increase $K$ by +1.

The signal representing the sign bit will, in effect, make $V_{ref}$ either positive or negative in the D—A converter 22.

D—A converter 22 delivers an output signal voltage $V_{(D-A)} < \Psi_{ref}$ equation 5 to amplifier unit 28 and, more particularly, to the attenuator section $R_AR_B$ thereof. Digital subtractor unit 24 delivers signals representing ($K-E$) to decode matrix 60. Depending on the value of ($K-E$) one, and only one, of the switches $S_1$ through $S_5$ is enabled and the input signal $V_{(D-A)}$ is multiplied by appropriate power of 8 thereby yielding the output signal voltage $V_o = V_{(D-A)}8^{(K-E)}$ equation 6 which, in other terms, is $V_o = V_{in}V_{ref}8^K$ equation 7.

Figures 2, 3, 4:
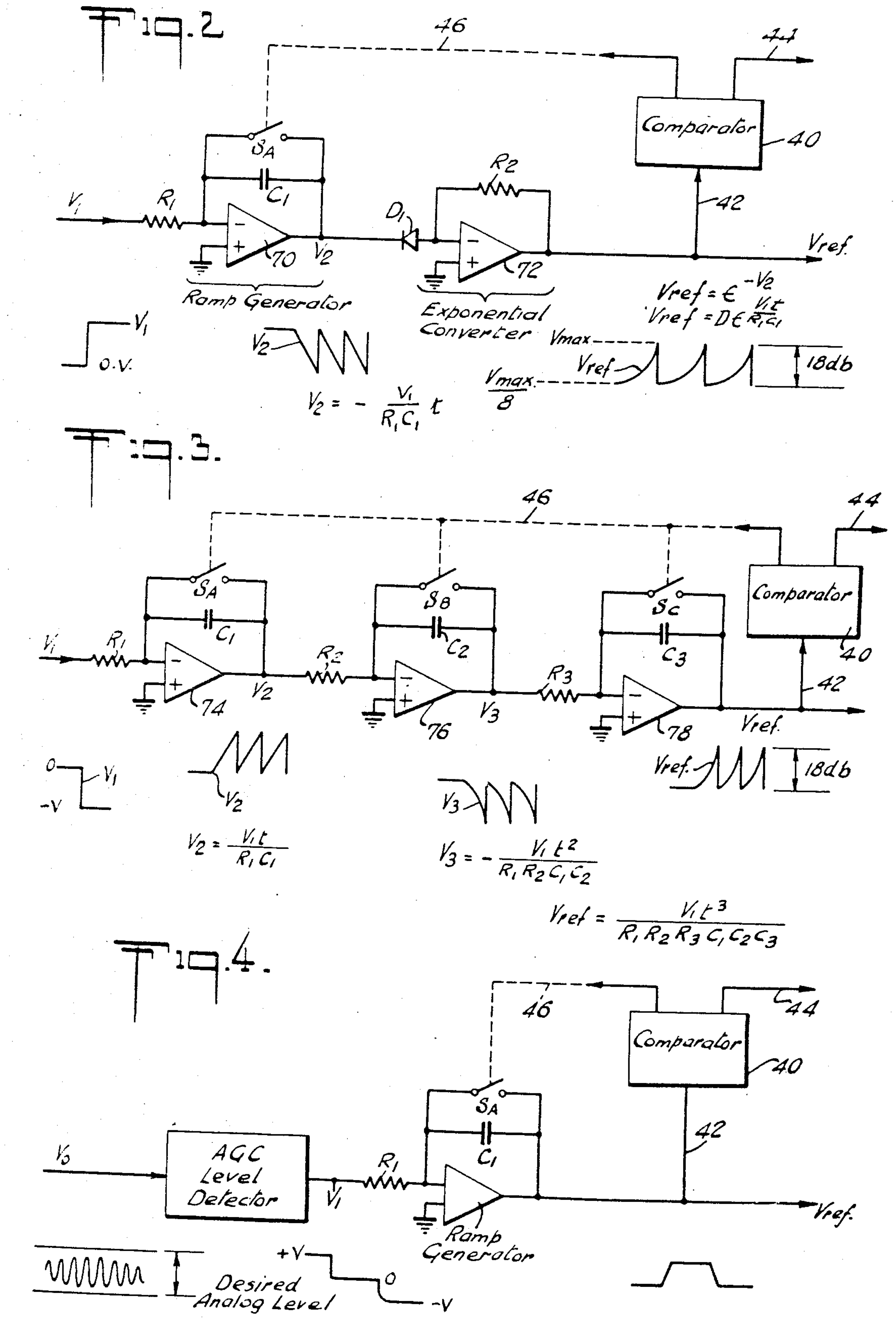
FIG. 2 is a block diagram showing apparatus for applying one form of programmed gain control to a reference voltage $V_{ref}$; i.e., applying a time varying gain function to $V_{ref}$.
FIG. 3 is a block diagram showing apparatus for applying another form of programmed gain control to the reference voltage $V_{ref}$; i.e., applying a different time varying gain function to $V_{ref}$.
FIG. 4 is a block diagram for showing apparatus for applying a form of automatic gain control to the reference voltage $V_{ref}$.

FIGS. 2, 3, and 4 show modifications of the general system of FIG. 1 and have to do with applying gain control to the signals being processed.

For many applications including seismic applications, but by no means limited thereto, it is desirable to apply some time varying gain function to the data. This is necessary because of the large dynamic amplitude range of the input signal ($V_{in}$) and the relatively small dynamic amplitude range of the signal $V_o$ which is to be made visible in the form of an oscillogram, or wiggle trace.

The system shown in FIG. 1, hereinbefore described, lends itself to gain control by applying a gain function $G(t)$ to $V_{ref}$ such that:

$$V_{ref} = G(t)\, V_{max} \quad \text{equation 8}$$

where $V_{max}$ is the maximum permissible value of $V_{ref}$ and where $0 \leq G(t) \leq 1$.

Therefore, substituting equation 8 in equation 7 there results $$V_o = V_{in}8^KV_{max}G(t) \quad \text{equation 9}$$

Equation 9 indicates that the output voltage $V_o$ may be scaled to any desired level and, moreover, any desired gain function $G(t)$ may be applied to maintain $V_o$ at a level suitable for visual display. However, $V_{ref}$ is required to vary over the full dynamic range of the input signal $V_{in}$. For systems with a large dynamic amplitude range it may not always be practical to vary $V_{ref}$ over the full range. One practical solution to the problem is to permit $K$ to change in increments of unity whereby $V_o$ is changed by a 1 to 8 volt range (18 db). Thus, by combining the effects of incrementing $K$ and varying $V_{ref}$ a practical system is achieved; e.g., reference voltage $V_{ref}$ is required to change over only an 18 db range. Each time $V_{ref}$ reaches the upper limit of its range ($V_{max}$), $K$ is incremented and $V_{ref}$ is reset to its lower limit ($V_{max}/8$.) The foregoing applies to increasing gain functions. In the case of decreasing gain functions, each time $V_{ref}$ reaches the lower limit of its range ($V_{max}/8$), K is incremented by −1 and $V_{ref}$ reset to its upper limit $^V$max. Incrementing $K$ by +1 creates a +18 db step. Resetting $V_{ref}$ from $V_{max}$ to $V_{max}/8$ creates a —~db step. By simultaneously changing $K$ and $V_{ref}$ the net effect is zero. Therefore, no discontinuities occur in the gain function.

For seismic applications the gain function is usually an exponential function of the form $E^{Bt}$.

In FIG. 2 there is illustrated one system in schematic form for generating an exponential gain function. With the exception of the comparator 40 the other elements shown in FIG. 2 constitute in detail the reference voltage generator 38 of FIG. 1.

As shown in FIG. 2 there is provided a step voltage input source $V_1$, a ramp generator section, an exponential converter section and the comparator 40. Ramp generator section includes an input resistor $R_1$, an operational amplifier 70, a capacitor $C_1$ and switch means $S_A$. These elements are connected as shown in the schematic drawing of FIG. 2. The exponential converter is comprised of an operational amplifier 70 having a resistor $R_2$, bridging its input and output terminals and $D_1$ in the input path.

The input to the ramp generator section is a step voltage function which occurs at time $t=0$. The ramp generator section produces an output voltage $V_2$ which increases linearly with time. The exponential converter section uses the logarithmic characteristics of diode $D_1$ to generate the output reference voltage $V_{ref}$ which is proportional to $V_2$. The value of $R_2$ may be chosen to scale the output such that $$V_{ref} = DE^{\frac{V_1 t}{R_1 C_1}} \qquad \text{(Equation 10)}$$

where $D$ and $E$ are constants with $E$ being the base of the well known system of natural logarithms.

When comparator 40 senses that $V_{ref}$ has reached its maximum value switch means $S_A$ is closed momentarily via path 46 thereby discharging capacitor $C_1$ thereby resetting voltage $V_2$ to its initial value. When $V_2$ returns to its initial value the output $V_{ref}$ of the exponential converter also returns to its initial value. Comparator 40 also generates a signal via path 46 which when delivered to $K$ generator 26 increments $K$ by one. As a result $V_{ref}$ is reduced 18 db decreasing the gain in the A–D converter unit 22 by −18 db and the exponent $(K-E)$ is increased thereby increasing the gain in amplifier unit 28 by +18 db. As $S_A$ opens the cycle is repeated. The result of this operation is that there is provided a programmed gain control action wherein the playback gain increases at a selected rate determined by $R_1C_1$. If expressed in db/sec. this gain expansion is linear.

It is to be understood that in the FIG. 1 and FIG. 2 systems the initial gain (i.e., the gain at $t=0$) may be set to a selected value by setting the initial DC value of voltage $V_2$. It is also possible to set the final gain to a selected value by removing the step input voltage $V_1$. When $V_1=0$ volts the gain remains constant at whatever value it may have.

Another time varying gain function may be employed. For example, a third order function $G(t)=f(t^3)$ may be employed for the purpose of providing an acceptable playback. FIG. 3 illustrates such a system for generating a third order gain function. As shown in FIG. 3, three ramp generators, identified generally by the reference numbers 74, 76 and 78, are provided. In addition, as shown, a step voltage source $V_1$ is provided. Switches $S_A$, $S_B$ and $S_C$ are used to simultaneously reset the ramp generators in the same manner as described hereinbefore with respect to FIG. 2.

Depending on the accuracy required the gain function may be made simpler and reduced to a second order or first order function. Even the simpler first order function would be acceptable when used with exponent changes obtained by incrementing $K$. The result would be to make an exponential function which is piecewise linear; each linear segment extending, for example, over only an 18 db range.

The systems shown particularly in FIGS. 2 and 3 may be characterized as programmed gain control; i.e., the gain function increases with time at a predetermined rate.

Another form of gain control, other than programmed gain control, is illustrated in FIG. 4. In the system of FIG. 4 the amplitude of the analog signal $V_o$ controls the rate of gain expansion. This is automatic gain control, or AGC. As shown, an AGC level detector senses the analog voltage. If the analog signal is too small $V_1$ is driven negative and the ramp generator causes $V_{ref}$ to be driven positive. When the analog signal becomes too large $V_1$ is driven positive and $V_{ref}$ is reduced. Since $V_{ref}$ has a direct effect on the amplitude of the analog signal, the arrangement shown causes the level of the analog signal to remain substantially constant throughout the dynamic range of the ramp generator. Whenever the limit of the ramp generator is reached, the value of $K$ is incrementally changed via path 44. See FIG. 4. The analog signal is then returned to within the dynamic range of the ramp generator.

In general, it ought to be noted that equation 1 could be written by substituting a generalized radix $R$ for 8.

Moreover, although the foregoing description makes reference to obtaining a permanent record in the form of an oscillogram the scope of the inventive concept contemplates obtaining visible displays, generally; such as, for example, the display provided on the face of a cathode ray oscilloscope.

While more than one embodiment of the invention has been described herein and illustrated in the drawings, it is to be understood that this has been done for purposes of illustration, not limitation, and that the scope of the invention is to be determined from the scope of the claims annexed herewith.

What is claimed is:

1. In a system wherein each analog signal, among a wide dynamic amplitude range of analog signals, is represented by a corresponding digital word in the form of digital signals representing the algebraic equation $V_{in}=AR^{-E}$ wherein $V_{in}$ represents the amplitude of a particular analog signal in said range, $A$ represents a mantissa, $R$ represents a radix of the number system used and $E$ represents an exponent, and wherein some of said digital signals corresponding to said word represent $E$, the method of making, from said digital signals, an analog signal $V_o$ of compressed dynamic amplitude range comprising:

generating a periodic analog reference signal $V_{ref}$ which has minimum and maximum signal levels;

converting the digital signals representing $A$ to a corresponding analog signal;

combining the analog signal corresponding to $A$ with analog reference signal $V_{ref}$ to produce an analog signal $V_{(D-A)}=AV_{ref}$;

generating a digital signal representing a number $K$;

changing the value of $K$ by a predetermined amount each time analog signal $V_{ref}$ reaching said maximum level;

combining the digital signals representing $K$ and $E$ to produce a digital signal representing the number $(K-E)$; and, amplifying the analog signal $V_{(D-A)}$ according to an amplification factor equal to $R^{(K-E)}$, wherein the exponent of $R$ is the digital value of $(K-E)$, to produce the analog signal $V_o=V_{(D-A)}R^{(K-E)}$ in response to the digital signal $(K-E)$.

2. In a system wherein each analog signal, among a wide dynamic amplitude range of analog signals, is represented by a corresponding digital word in the form of digital signals representing the algebraic equation $V_{in}=AR^{-E}$ wherein $V_{in}$ represents the amplitude of a particular analog signal in said range, $A$ represents a mantissa, $R$ represents a radix of the number system used and $E$ represents an exponent, and wherein some of said digital signals corresponding to said word represent $A$ and some of said digital signals corresponding to said word represent $E$, the method of making from said digital signals, an analog signal $V_o$ suitable for making a visible display comprising:

generating a periodic analog reference signal $V_{ref}$ which has minimum and maximum signal levels;

converting the digital signals representing $A$ to a corresponding analog signal;

combining the analog signal corresponding to $A$ with analog reference signal $V_{ref}$ to produce an analog signal $V_{(D-A)}=AV_{ref}$;

generating a digital signal representing a number $K$;

changing the value of $K$ by a predetermined amount each time analog signal $V_{ref}$ reaches its maximum signal level in response to $V_{ref}$ reaching said maximum level;

combining the digital signals representing $K$ and $E$ to produce a digital signal representing the number $(K-E)$;

amplifying the analog signal $V_{(D-A)}$ according to an amplification factor equal to $R^{(K-E)}$ wherein the exponent of $R$ is the digital value of $(K-E)$, to produce the analog signal $V_o=V_{(D-A)}R^{(K-E)}$ in response to the digital signal $(K-E)$; and, making a visible display of the analog signal $V_o$.

3. The system according to claim 2 wherein said visible display is an oscillogram.

4. The system according to claim 2 wherein $R=8$.

5. In a system wherein each analog signal, among a wide dynamic amplitude range of analog signals, is represented by a corresponding digital word in the form of digital signals representing the algebraic equation $V_{in}=AR^{-E}$ wherein $V_{in}$ represents the amplitude of a particular analog signal in said range, $A$ represents a mantissa, $R$ represents a radix of the number system used and $E$ represents an exponent, and wherein some of said digital signals corresponding to said word represent $A$ and some of said digital signals corresponding to said word represent $E$, the method of making, from said digital signals, an analog signal $V_o$ of compressed amplitude range comprising;

generating a periodic analog reference signal $V_{ref}=V_{max}G^{(t)}$ which has maximum and minimum signal levels and wherein $V_{max}$ is the maximum reference signal level and wherein $G(t)$ represents a time varying gain function;

converting the digital signals representing $A$ to a corresponding analog signal;

combining the analog signal corresponding to $A$ with analog reference signal $V_{ref}$ to produce an analog signal $V_{(D-A)}=AV_{ref}$;

generating a digital signal representing a number $K$;

changing the value of $K$ by a predetermined amount each time analog signal $V_{ref}$ reaches its maximum signal level in response to $V_{ref}$ reaching said maximum level, $V_{max}$;

combining the digital signals representing $K$ and $E$ to produce a digital signal representing the number $(K-E)$; and, amplifying the analog signal $V_{(D-A)}$ according to an amplification factor equal to $R_{(K-E)}$ wherein the exponent of $R$ is the digital value of $(K-E)$, to produce the analog signal $V_o=V_{in}V_{max}\ G(t)8^K$ in response to the signal representing $(K-E)$.

6. The system according to claim 5 further comprising the making of a visible display of the analog signal $V_o$.

7. In a system wherein each analog signal, among a wide dynamic amplitude range of analog signals, is represented by a corresponding digital word in the form of digital signals representing the algebraic equation $V_{in}=AR_-^E$ wherein $V_{in}$ represents the amplitude of a particular analog signal in said range, $A$ represents a mantissa, $R$ represents a radix of the number system used and $E$ represents an exponent, and wherein some of said digital signals corresponding to said word represent $A$ and some of said digital signals corresponding to said word represent $A$ and some of said digital signals corresponding to said word represent $E$, apparatus for making, from said digital signals, an analog signal $V_o$ suitable for making a visible display comprising:

means for generating a periodic reference signal $V_{ref}$ which has minimum and maximum signal levels;

means for converting the digital signals representing $A$ to a corresponding analog signal;

means for combining the analog signal corresponding to $A$ with reference signal $V_{ref}$ to produce an analog signal $V_{(D-A)}=AV_{ref}$;

means for generating a signal representing a number $K$;

means for changing the value of $K$ by a predetermined amount each time $V_{ref}$ reaches its maximum level in response to $V_{ref}$ reaching said maximum level;

means for combining the signals representing $K$ and $E$ to produce a signal representing the number $(K-E)$;

means for amplifying the analog signal $V_{(D-A)}$ according to an amplification factor equal to $R^{(K-E)}$ wherein the exponent of $R$ is the digital value of $(K-E)$, to produce the analog signal $V_o=V_{(D-A)}R^{(K-E)}$ in response to the signal $(K-E)$; and, means for making a visible display of the analog signal $V_o$.

8. A system as defined in claim 7, wherein said means for generating said periodic reference signal $V_{ref}$ comprises means for generating a $V_{ref}$ signal which varies in time according to a predetermined function, thereby providing programmed gain control.

9. A system as defined in claim 7, comprising means for sensing the value of said analog output signal $V_o$ and wherein means are provided for controlling the means for generating said periodic reference signal $V_{ref}$ so as to cause said reference signal $V_{ref}$ to tend to maintain a constant output level, thereby providing automatic gain control.

10. In a system wherein each analog signal, among a wide dynamic amplitude range of analog signals, is represented by a corresponding digital word in the form of digital signals representing the algebraic equation $V_{in}=AR^{E}$ wherein $V_{in}$ represents the amplitude of a particular analog signal in said range, $A$ represents a mantissa, $R$ represents a radix of the number system used and $E$ represents an exponent, and wherein some of said digital signals corresponding to said word represent $A$ and some of said digital signals corresponding to said word represent $E$, apparatus for making, from said digital signals, an analog signal $V_o$ of compressed dynamic amplitude range comprising:

means for generating a periodic analog reference signal $V_{ref}=V_{max}\ G(t)$ wherein $V_{max}$ is the maximum signal level and $G(t)$ represents a time varying gain function;

means for converting the digital signals representing A to a corresponding analog signal;

means for combining the analog signal corresponding to $A$ with analog reference signal $V_{ref}$ to produce an analog signal $V_{(D-A)}=AV_{ref}$;

means for generating a digital signal representing a number $K$;

means for changing the value of $K$ by a predetermined amount each time analog signal $V_{ref}$ reaches its maximum signal level in response to $V_{ref}$ reaching said maximum level;

means for combining the digital signals representing $K$ and $E$ to produce a digital signal representing the number $(K-E)$; and, means for amplifying the signal $V_{(D-A)}$ according to an amplification factor equal to $R^{(K-E)}$ wherein the exponent of $R$ is the digital value of $(K-E)$, to produce the analog signal $V_o=V_{in}V_{max}\ G(t)8^{K}$ in response to the signal representing $(K-E)$.

11. The system according to claim 10 further comprising means for making an oscillogram of the signal $V_o$.

* * * * *